UNITED STATES PATENT OFFICE 2,408,633

PRODUCTION OF SUBSTITUTED QUINAZOLONES FROM ORGANIC PHOSPHAZO COMPOUNDS

Alfred Guenther, Riegelsville, Pa., and Jack F. Morgan, Phillipsburg, N. J., assignors to General Aniline & Film Corporation, New York, N. Y., a corporation of Delaware No Drawing. Application April 7, 1945, Serial No. 587,213

10 Claims. (Cl. 260—251)

The present invention relates to the preparation of substituted quinazolones and to such quinazolones.

It has been suggested that quinazolones be prepared by the interaction of acylanthranils with amines. While this method can be operated to give good yields, it nevertheless requires the employment of intermediates which are highly unstable with respect to moisture. Consequently, considerable care must be exercised in the handling of the intermediates if satisfactory yields are to be obtained.

Most of the other methods which have been employed for the production of quinazolones require the use of such high temperatures as necessarily cause some decomposition of the reactants. For example, 2-methyl-3-phenyl-4-quinazolone has been prepared by heating o-acetamide benzanilide to temperatures of 175 to 210° C. These procedures suffer from the disadvantages that the decomposition involved not only lowers the yield but through by-product formation decreases the purity of the desired end product.

It has now been discovered that substituted quinazolones can be prepared while avoiding the disadvantages of the prior art by heating an organic phosphazo compound with an N-acyl-o-amino carboxylic acid in an organic solvent. These products react together smoothly at moderately elevated temperatures to produce the desired quinazolones in a pure condition and in good yields. The organic phosphazo compounds are prepared by the reaction of phosphorus trichloride and primary amines, which are common stable materials. The preparation of substituted quinazolones by the reaction of organic phosphazo compounds and N-acyl-o-amino carboxylic acids and the quinazolones so obtained constitute the purposes and objects of the present invention.

The quinazolones, the production of which is contemplated herein, have the following structural formula:

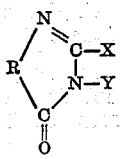

in which R is an aromatic or heterocyclic nucleus which may be substituted by monovalent groups, for example, nitro, halogen, such as chlorine, bromine and the like, alkyl such as methyl, ethyl, propyl, butyl, amyl, lauryl and the like, alkoxy such as methoxy, ethoxy, propoxy and the like, X is alkyl as above and Y is an aliphatic radical such as alkyl as above and alkylamino such as methylamino, ethylamino and the like, an aromatic radical such as phenol, tolyl, anisyl, phenetyl, m-nitrophenyl, p-chlorophenyl, naphthyl, phenylamino and the like, cycloaliphatic such as cyclopentyl, cyclohexyl and the like, or a heterocyclic nitrogenous nucleus such as pyridyl, quinolyl, and the like. Where Y is alkylamino or phenylamino, the alkyl or phenyl radical will be separated from the quinazolone nitrogen by an —NH— group. The aromatic or heterocyclic nucleus represented by the character R may be benzene, naphthalene, anthracene, anthraquinone, dibenzofurane, carbazole, diphenylene sulfide and the like.

The reaction is effected by heating N-acyl-o-amino-cyclic carboxylic acid with the organic phosphazo compound in a suitable solvent therefor. The degree of heating required depends on the nature of the reactants and may vary considerably. While it is preferred to effect the reaction by refluxing the reaction mixture, it should be borne in mind that it is possible to carry out the reaction by heating to a temperature below the boiling point of the reactants.

The N-acyl amino cyclic carboxylic acids employed may be represented by the following formula:

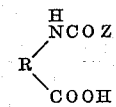

in which Z is alkyl such as methyl, ethyl, propyl, butyl, amyl, octyl, decyl and the like, and R has the values given above, the amide group and the carboxylic acid group being in o-position of the nucleus represented by R. Examples of such compounds are:

N-acetyl anthranilic acid
N-acetyl-5-chloro anthranilic acid
N-propionyl anthranilic acid
N-butyryl anthranilic acid
N-acetyl-o-amino naphthoic acid
N-acetyl-5-nitro anthranilic acid
N-acetyl-6-methyl anthranilic acid
N-acetyl-5-ethoxy anthranilic acid and the like.

The organic phosphazo compounds, the reaction of which is contemplated herein, have the following general formula:

$$(R-N=P-NHR)_n$$

in which $n$ is 1 or 2 and R represents an aliphatic chain such as methyl, ethyl, propyl, butyl, amyl, octyl, dodecyl, stearyl, and the like, an alicyclic nucleus such as cyclopentyl, cyclohexyl or the like, an aromatic nucleus such as phenyl naphthyl, anthracyl and the like, or a heterocyclic nucleus such as pyridyl, quinolyl, carbazolyl, diphenylene oxide, diphenylene sulfide and the like. The radical represented by R may also be substituted by such substituent groups as halogen such as chlorine, bromine and the like, alkyl such as ethyl, methyl, propyl, butyl and the like, alkoxy, such as methoxy, ethoxy, propoxy and the like, amino, substituted amino such as alkylated amino, i. e., dimethylamino, diethylamino and the like, and sulfo.

The organic phosphazo compounds are readily produced by the reaction of an organic primary amine with phosphorous trichloride, preferably in the ratio of 5:1, and in the presence of an organic solvent. The organic primary amine which is employed may be aliphatic such as methylamine, ethylamine, propylamine, butylamine, octylamine, dodecylamine and the like, an alicyclic amine such as cyclopentylamine, cyclohexylamine, and the like, an aromatic amine such as aniline, o-toluidine, m-toluidine, p-toluidine, m-chloraniline, o-anisidine, m-nitro aniline, p-amino diphenylamine, m-phenylene diamine, p-phenylene diamine, benzidine, 4.4'-diaminodiphenyl methane, alpha-naphthylamine, sulfanilic acid or a heterocyclic amine such as 2-amino pyridine, 2-amino quinoline, 2-amino diphenylene oxide, and the like.

The amine should in no case contain in the o- or p-position to the amino nitrogen, a nitro or carbonyl group. When amines of the latter constitution are employed, either no reaction ensues or the reaction takes place with vigorous decomposition resulting in a tarry, unidentifiable mass.

The solvents used should be inert to the reactants and should be normally liquid. Suitable solvents are normally liquid aromatic hydrocarbons such as benzene, toluene and the like, the chlor derivatives thereof, such as monochlorbenzene, monochlortoluene and the like, normally liquid aliphatc hydrocarbons such as octane, solvent naphtha, kerosene and their chlor derivatives such as ethylene chloride, butyl chloride, octyl chloride and chlor kerosene and normally liquid nitrogenous heterocyclic bases such as pyridine, quinoline and the like.

The reaction by which the substituted quinazolones are produced, assuming that the N-acyl-o-amino carboxylic acid is N-acetyl anthranilic acid and the organic phosphazo compound is phenyl phosphazo anilide, may be graphically represented as follows:

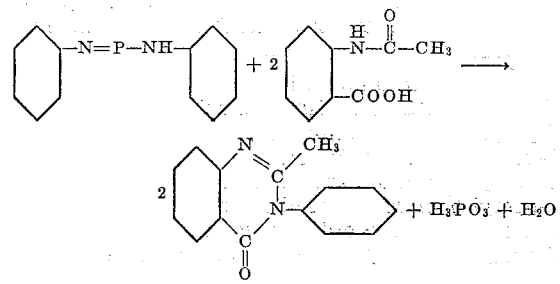

It will be observed that according to this formula 1 mol of the phosphazo compound is reacted for each 2 mols of the N-acyl-o- amino carboxylic acid to yield 2 mols of the substituted quinazolone. While the quantities of the reactants may be varied from that indicated in the equation, it is found that for best results the molar proportions designated should be resorted to.

The substituted quinazolones of the present invention may be utilized as intermediates in the formation of dyestuffs.

The following examples serve to further illustrate the invention but it is to be understood that these examples are illustrative and not limitative in nature. The parts are by weight.

*Example I. — 2-methyl-3-phenyl-4-quinazolone*

150 parts of a toluene solution containing 10.7 parts of crude phenylphosphazoanilide

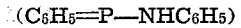

is treated with 17.9 parts of N-acetylanthranilic acid. The mixture is agitated, heated to the reflux temperature, and agitation thereof maintained at this temperature for 1 to 2 hours. The suspension is treated with 300 parts of 5% sodium carbonate solution and the toluene removed by steam distillation. The white solid which remains is separated by filtration, washed with water and dried.

There is thus obtained 19.3 parts of a crude product melting at 138 to 140° C. This quantity represents 82% of the theoretical yield. By recrystallizing from alcohol, pure 2-methyl-3-phenyl-4-quinazolone melting at 147 to 148° C. is obtained.

A benzo-substituted quinazolone of the following formula is obtained by replacing the N-acetylanthranilic acid by 25.5 parts of 2-N-acetyl-amino-3-naphthoic acid.

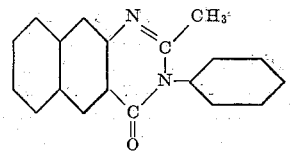

The phenylphosphazoanilide employed in this reaction is obtained by heating 260 parts of toluene and 186 parts of aniline to 50° C. and adding in the course of one-half hour 55 parts of phosphorus trichloride and 43 parts of toluene. The mixture is agitated during the addition of the phosphorus trichloride and for one hour thereafter. The aniline hydrochloride which is formed is filtered off and the filtrate used directly or evaporated and dried to isolate the crude phenylphosphazoanilide.

*Example II. — 2-methyl-3-p-chlorophenyl-4-quinazolone*

The procedure is the same as in Example I except that there are used as the organic phosphazo compound 14.6 parts of 4.4'-dichlorphenylphosphazoanilide. The 4.4' - dichlorphenylphosphazoanilide is obtained in a manner similar to that utilized to produce the unsubstituted phenylphosphazoanilide.

*Example III. — 2-methyl-3-phenyl-6-chloro-4-quinazolone*

The procedure is the same as in Example I except that there is used in lieu of N-acetyl-anthranilic acid 21.35 parts of N-acetyl-5-chloro anthranilic acid.

*Example IV. — 2-methyl-3-p-methylphenyl-4-quinazolone*

The procedure is the same as in Example I except that there is used in lieu of the phenylphosphazoanilide 12.11 parts of p-toluylphosphazo-p'-toluidide.

This phosphazo compound is prepared in a manner similar to that utilized in preparing the phenylphosphazoanilide.

*Example V.—2-methyl-3-butyl-4-quinazolone*

A solution of 73 parts of N-butylamine and 130 parts of toluene is agitated and treated dropwise with a solution of 27.5 parts of phosphorus trichloride and 22 parts of toluene. The suspension thus obtained is agitated and heated at the reflux temperature for one hour. The hot reaction mixture is filtered and the solid amine hydrochloride washed with 150 parts of hot toluene. About 48 parts (73% of the theoretical) of N-butylamine hydrochloride are thus recovered.

50 parts of the toluene filtrate, which contains roughly about 9.2 parts of the butylphosphazobutylamide are diluted with 100 parts of toluene and to the resulting solution there are added 17.9 parts of N-acetylanthranilic acid. The mixture is heated to the reflux temperature and agitated for a period of about 2 hours. To the reaction mixture there is then added a sufficient amount of 5% sodium carbonate solution to render the reaction mixture alkaline and the toluene is removed by steam distillation. The solid remaining is separated by filtration, washed with water and recrystallized from alcohol.

The product is pure 2-methyl-3-butyl-4-quinazolone.

*Example VI.—2-methyl-3-lauryl-4-quinazolone*

The procedure is the same as in Example V except that there are used 185 parts of laurylamine in lieu of 73 parts of N-butylamine.

*Example VII.—2-methyl-3-cyclohexyl-4-quinazolone*

99 parts of cyclohexylamine are dissolved in 130 parts of toluene and while agitated treated with a solution of 27.5 parts of phosphorus trichloride diluted with 22 parts of toluene. The resulting suspension is refluxed with agitation for a period of 1 hour and filtered to remove cyclohexylamine hydrochloride. 79.1 parts of the cyclohexylamine hydrochloride are recovered, representing 97% of theory.

The solid is washed with 150 parts of hot toluene. 123 parts of the toluene filtrate, which contain roughly about 11.3 parts of the cyclohexylphosphazo cyclohexylamide, are diluted with 50 parts of toluene and there is then added 17.9 parts of N-acetylanthranilic acid. The mixture is heated to reflux until hydrogen chloride is no longer given off, whereupon the suspension is treated with sufficient 5% sodium carbonate solution to render the reaction mixture alkaline. The toluene is removed by steam distillation leaving a light tan solid which upon treatment with hydrochloric acid yields pure white 2-methyl-3-cyclohexyl-4-quinazolone hydrochloride.

*Analysis*

|   | Calculated | Found |
|---|---|---|
|   | Percent | Percent |
| N | 9.77 | 9.60 |
| C | 12.36 | 12.15 |

Various modifications of the invention will occur to persons skilled in the art and we therefore do not intend to be limited in the patent granted except as required by the prior art and the appended claims.

We claim:

1. The process of producing substituted quinazolones which comprises heating an organic phosphazo compound having the general formula $$(R-N=P-NHR)_n$$

wherein $n$ is selected from the class consisting of 1 and 2, and R is selected from the class consisting of an aliphatic chain, an alicyclic nucleus, an aromatic nucleus and a heterocyclic nucleus and is free from nitro and carbonyl groups in o- and p-position to its linkage to the remainder of the molecule with an N-acyl-o-aminocyclic carboxylic acid selected from the class consisting of aromatic and heterocyclic carboxylic acids in the presence of an inert, normally liquid organic solvent.

2. The process as defined in claim 1 wherein 1 mol of the organic phosphazo compound is employed for each 2 mols of the N-acyl-o-amino carboxylic acid.

3. The process as defined in claim 1 wherein R is an aliphatic chain.

4. The process as defined in claim 1 wherein R is an aromatic nucleus.

5. The process as defined in claim 1 wherein R is a heterocyclic nucleus.

6. The process as defined in claim 1 wherein the reactants are heated to the reflux temperature of the solvent.

7. The process as defined in claim 1 wherein the N-acyl-o-amino cyclic carboxylic acid is of the benzene series.

8. The process of producing 2-methyl-3-phenyl-4-quinazolone which comprises refluxing 1 mol of phenylphosphazoanilide with 2 mols of N-acetyl anthranilic acid in the presence of toluene.

9. The process of producing 2-methyl-3-lauryl-4-quinazolone which comprises refluxing 1 mol of lauryl phosphazo lauryl amide with 2 mols of N-acetyl anthranilic acid in toluene.

10. The process of producing 2-methyl-3-α-pyridyl-4-quinazolone which comprises refluxing 1 mol of α-pyridylphosphazo pyridyl amide with 2 mols of N-acetyl anthranilic acid in toluene.

ALFRED GUENTHER.
JACK F. MORGAN.